(12) United States Patent
Ham (10) Patent No.: US 7,188,905 B2
(45) Date of Patent: Mar. 13, 2007

(54) RECLINING DEVICE FOR VEHICLE SEATS

(75) Inventor: Sang-Sik Ham, Anyang-si (KR)

(73) Assignee: MR Industrial Co., Ltd., Incheon (KR)

( * ) Notice: Subject to any disclaimer, the term of this patent is extended or adjusted under 35 U.S.C. 154(b) by 0 days.

(21) Appl. No.: 11/083,059

(22) Filed: Mar. 17, 2005

(65) Prior Publication Data

US 2005/0212339 A1    Sep. 29, 2005

(30) Foreign Application Priority Data

Mar. 18, 2004    (KR) .................. 10-2004-0018315

(51) Int. Cl.
*B60N 2/02*    (2006.01)
(52) U.S. Cl. .................................... 297/367
(58) Field of Classification Search ............. 297/367
See application file for complete search history.

(56) References Cited

U.S. PATENT DOCUMENTS

| | | | |
|---|---|---|---|
| 5,590,931 A * | 1/1997 | Fourrey et al. | 297/366 |
| 5,685,611 A * | 11/1997 | Eguchi et al. | 297/367 |
| 5,749,624 A * | 5/1998 | Yoshida | 297/367 |
| 6,023,994 A * | 2/2000 | Yoshida | 74/530 |
| 6,039,400 A * | 3/2000 | Yoshida et al. | 297/367 |
| 6,112,370 A * | 9/2000 | Blanchard et al. | 16/325 |
| 6,520,583 B1* | 2/2003 | Bonk | 297/367 |
| 6,758,525 B2* | 7/2004 | Uramichi | 297/366 |
| 2003/0173810 A1* | 9/2003 | Lee et al. | 297/367 |
| 2004/0145227 A1* | 7/2004 | Bonk | 297/367 |
| 2005/0035640 A1* | 2/2005 | Shinozaki | 297/367 |
| 2005/0168035 A1* | 8/2005 | Fast | 297/367 |

FOREIGN PATENT DOCUMENTS

| | | | |
|---|---|---|---|
| GB | 2117440 A | * | 10/1983 |
| KR | 1020000056786 | | 9/2000 |

* cited by examiner

*Primary Examiner*—Peter M. Cuomo
*Assistant Examiner*—Sarah B. McPartlin
(74) *Attorney, Agent, or Firm*—The Webb Law Firm (57) ABSTRACT

A reclining device for vehicle seats having a structure capable of reliably maintaining a seat back locking state for preventing the seat back from being undesirably moved on the seat cushion is disclosed. The reclining device includes a base plate, an arm plate, a central shaft, a cam, a pair of locks, a guide plate, an action spring, a return spring, and an actuating lever. The central shaft has a first angled part provided on an intermediate portion of the central shaft and a second angled part provided on an end of the central shaft. The cam has a through hole, a main cam heel and a pair of subsidiary cam heels. Each lock has a main lock heel, a pair of subsidiary lock heels, and a guide protrusion provided on a surface of the lock in a direction parallel to an axis of the central shaft.

7 Claims, 9 Drawing Sheets

FIG 1

PRIOR ART

FIG 2

PRIOR ART

RECLINING DEVICE FOR VEHICLE SEATS

BACKGROUND OF THE INVENTION

1. Field of the Invention

The present invention relates generally to a reclining device for vehicle seats and, more particularly, to a reclining device for vehicle seats which is capable of adjusting the angle of a seat back of a vehicle seat with respect to a seat cushion of the vehicle seat in forward and backward directions, thus allowing a driver or a passenger to maintain a comfortable sitting posture suitable for his/her body type.

2. Description of the Related Art

Generally, railroad cars and airplanes as well as automobiles are provided with comfortable vehicle seats for the occupants to sit on. Each vehicle seat includes a reclining device which controls the angle of a seat back of the vehicle seat with respect to a seat cushion of the vehicle seat by rotating the seat back forwards and backwards, thus allowing a user to maintain a comfortable sitting posture suitable for his/her body type, or to lay down on the vehicle seat to take a rest, as required.

Typically, such a reclining device is provided at a junction between a seat cushion frame and a seat back frame constituting a vehicle seat. The seat back frame of the vehicle seat can be angled with respect to the seat cushion frame by manipulating an actuating lever of the reclining device. Because the reclining device has a number of components, the structure is complex. Recently, reclining devices for vehicle seats which have superior performance despite having simple structures have been developed and widely used.

In particular, a reclining device for vehicle seats which has a simple structure and promotes the safety of an occupant by reducing gaps between components, and which solves a problem of having to manufacture separate components whenever the specification of a seat changes due to the development of a new vehicle, and which enhances manufacturability of the seat and improves the quality and lightness of a product, was proposed in Korean Patent Registration No. 0297135.

Figure 1:
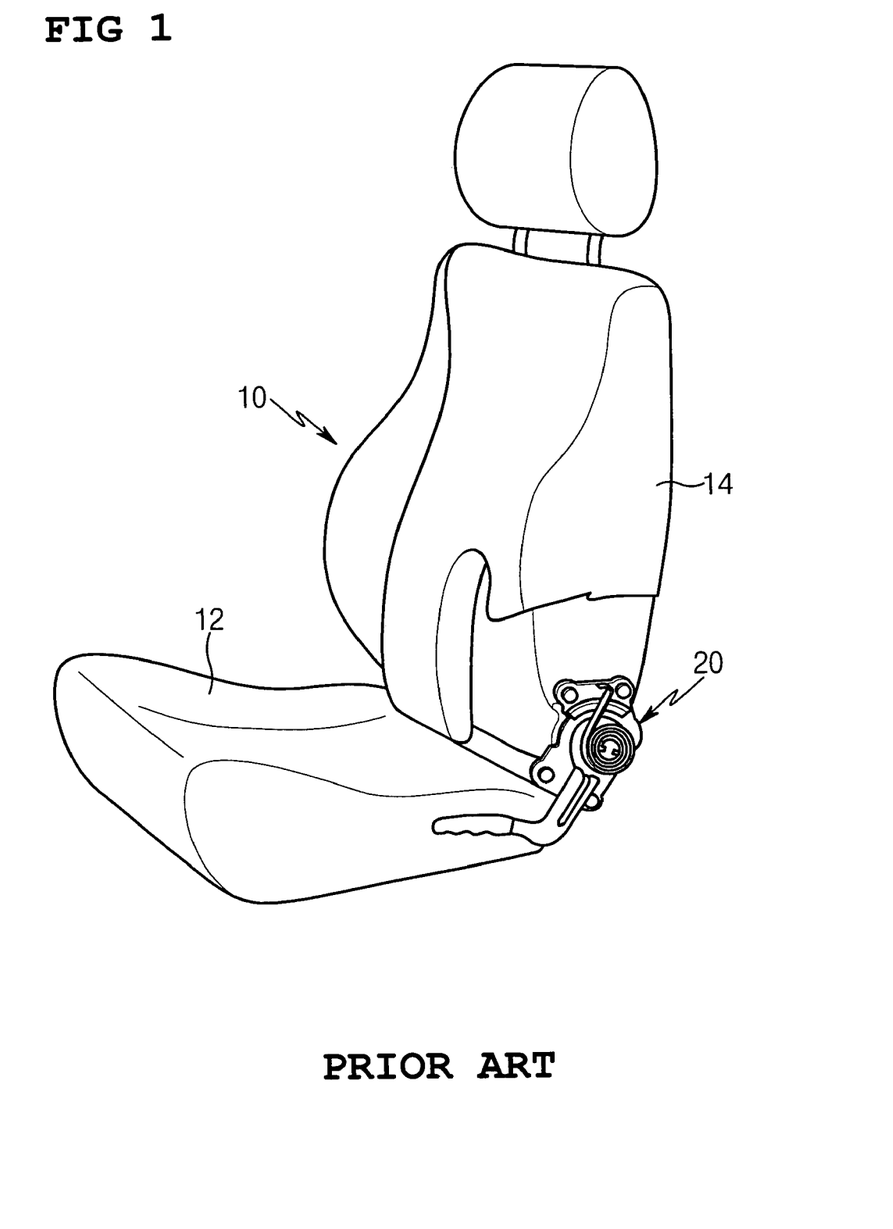
FIG. 1 is a partially broken perspective view showing a vehicle seat having a conventional reclining device.
Figure 2:
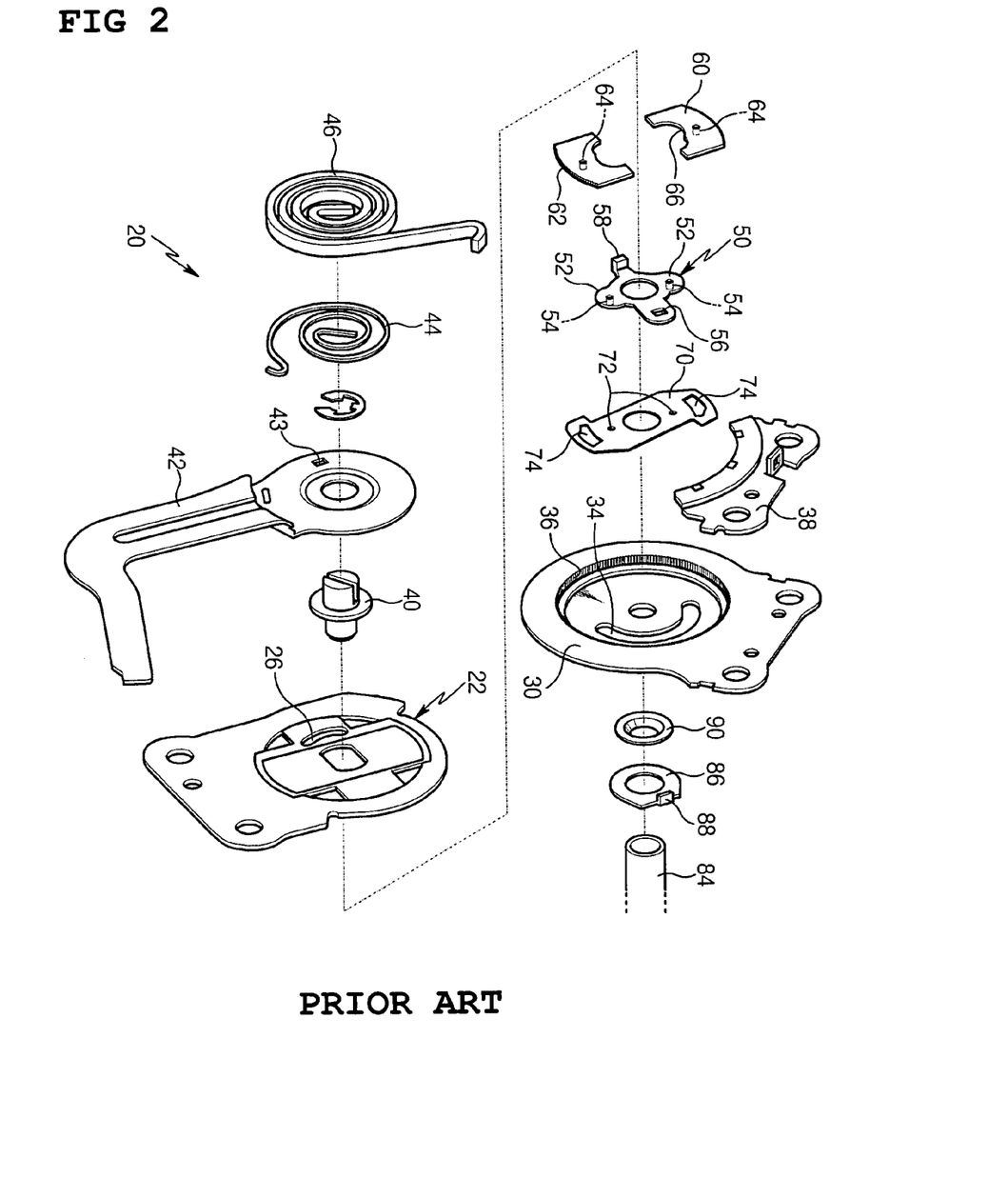
FIG. 2 is an exploded perspective view of the reclining device of FIG. 1.

The construction of the reclining device of No. 0297135 will be described herein below with reference to FIGS. 1 and 2. As shown in FIGS. 1 and 2, the reclining device 20 for a car seat 10 includes a base plate 22 which is mounted at a predetermined position on an end of a frame of a seat cushion 12 of the vehicle seat 10, and an arm plate 30 which has an upper bracket 38 at a predetermined position and is mounted to a lower end of a frame of a seat back 14. The reclining device 20 further includes an actuator which is placed in a space defined between the base plate 22 and the arm plate 30, and a shaft 40 which is provided through the base plate 22 to serve as an actuating means. The reclining device 20 further includes an actuating lever 42, a lever spring 44 and a return spring 46.

The actuator, which is provided in the space between the base plate 22 and the arm plate 30, allows the seat back 14 to recline with respect to the seat cushion 12 or maintains the posture of the reclined seat back 14, by connecting to or disconnecting from gear teeth 36 provided in the arm plate 30. The actuator includes a pair of lock gears 60 each having gear teeth 62, a cam lever 50 which moves the lock gears 60 to engage the gear teeth 62 of the lock gears 60 with the gear teeth 36 of the arm plate 30, and a cam plate 70 serving to disengage the gear teeth 62 of the lock gears 60 from the gear teeth 36 of the arm plate 30. The cam lever 50 has a pair of cams 52 to push the lock gears 60 outwards. Each lock gear 60 has a cam receiving notch 66 to receive each cam 52 therein. Each lock gear 60 and the cam lever 50 have a lock protrusion 64 and cam protrusions 54, respectively, so that both the lock gears 60 and the cam lever 50 are operated in conjunction with the cam plate 70 through the protrusions 54 and 64. The cam plate 70 has a pair of slots 74 which are provided at predetermined positions on the cam plate 70 to receive the lock protrusions 64 of the lock gears 60 and to advance or retract the lock gears 60 towards or away from the gear teeth 36 of the arm plate 30. The cam plate 70 further has a pair of coupling holes 72 into which the cam protrusions 54 of the cam lever 50 are fitted.

In the reclining device 20 having the above-mentioned construction, when the seat back 14 is in the original state, the gear teeth 62 of the lock gears 60 engage with the gear teeth 36 of the arm plate 30 because the cams 52 of the cam lever 50 push the lock gears 60 outwards due to the tension of the lever spring 44.

In this state, if the actuating lever 42 is pulled in a predetermined direction to recline the seat back 14, the cam lever 50 is rotated around the central shaft 40. Thus, each cam 52 of the cam lever 50 becomes placed in each cam receiving notch 66 of the lock gear 60. Simultaneously, the slots 74 of the cam plate 70 pull the lock protrusions 64 of the lock gears 60 inwards, so that the gear teeth 62 of the lock gear 60 disengage with the gear teeth 36 of the arm plate 30, thus causing the seat back 14 to be reclined with respect to the seat cushion 12.

However, there are several problems in the conventional reclining device 20 having the above-mentioned structure. The problems will be enumerated below.

First, in a locking state to prevent a reclining motion of the seat back 14, each cam 52 of the cam lever 50 pushes each lock gear 60 outwards due to the tension of the lever spring 44 such that the gear teeth 62 of the lock gear 60 engage with the gear teeth 36 of the arm plate 30. However, because the tension of the lever spring 44 is always applied to the cam lever 50 in one direction, the gear teeth 62 of the lock gear 60 do not perfectly engage with the gear teeth 36 of the arm plate 30.

Figure 8A:
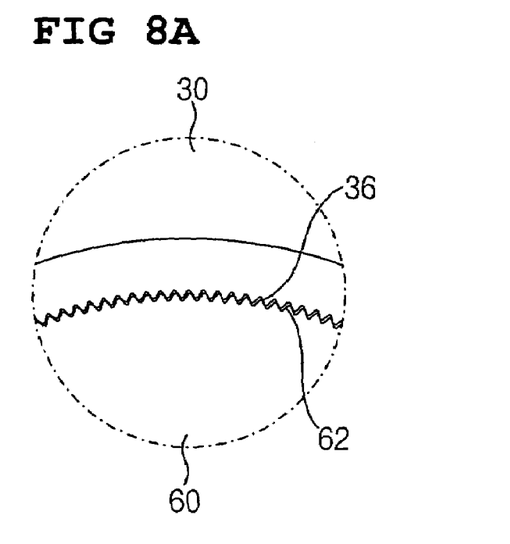
FIGS. 8a and 8b are views comparing engagements between gear teeth of locks and gear teeth of arm plates of a conventional reclining device and the reclining device according to the present invention.

In other words, because the lock gears 60 are pushed outwards by the cams 52 of the cam lever 50 which is always biased in one direction by the tension of the lever spring 44, the lock gears 60 are also biased in the same direction as the cam lever 50, which is biased to one side by the tension of the lever spring 44. As a result, the gear teeth 62 of the lock gear 60 do not exactly engage with the gear teeth 36 of the arm plate 30 (see, FIG. 8a).

Therefore, when the gear teeth 62 of the lock gear 60 engage with the gear teeth 36 of the arm plate 30, a gap occurs between the gear teeth 36 and 62. Accordingly, the seat back 14 may be undesirably moved on the seat cushion 12 by the gap occurring between the gear teeth 36 and 62, thus deteriorating the comfort and safety of an occupant.

Second, the coupling relationship of the components constituting the reclining device 20 is very complex. In addition, to couple the components together, each component has a complex shape. As a result, the conventional reclining device 20 is problematic in that manufacturability and productivity thereof are decreased.

In detail, in the conventional reclining device 20, a coupling protrusion 58 of the cam lever 50 is inserted into a coupling hole 43 of the actuating lever 42 after passing through an arc-shaped slot 26 of the base plate 22. Furthermore, the cam protrusion 54 is provided on a surface of each cam 52 of the cam lever 50 while the coupling holes 72 are formed through the cam plate 70 to correspond to the cam protrusions 54 of the cams 52. A fastening hole 56 is formed at a predetermined position diametrically opposite to the coupling protrusion 58 on the cam lever 50. A bent end 88 of an interlocking bracket 86, which is coupled to an interlocking shaft 86, is inserted into the fastening hole 56 of the cam lever 50. Moreover, the arm plate 30 has an arc-shaped slot 34 to receive the bent end 88 of the interlocking bracket 86 therein and allow the bent end 88 to move along the arc-shaped slot 34. As such, the conventional reclining device 20 has a complex structure, thus being difficult to manufacture. In addition, molding costs required to manufacture each component having a complex structure are excessively increased. As a result, there is a problem of reduced productivity.

Third, when the actuating lever 42 is pulled upwards to recline the seat back 14, because the coupling protrusion 58 of the cam lever 50 is inserted in the coupling hole 43 of the actuating lever 42, the cam lever 50 is rotated along with the actuating lever 42. Due to this reclining structure, stress is concentrated in the coupling protrusion 58 of the cam lever 50. Furthermore, because the cam plate 70 is rotated along with the cam lever 50 by the cam protrusions 54 of the cams 52 of the cam lever 50, which are fitted into the coupling holes 72 of the cam plate 70, when the actuating lever 42 is rotated, stress is also concentrated in the cam protrusions 54 of the cam lever 50. As well, stress is also concentrated in the bent end 88 of the interlocking bracket 86 which is fitted into the fastening hole 56 of the cam lever 50.

As such, while in the seat back reclining process, because stress is concentrated in specific parts of the components, durability of the reclining device 20 is reduced. Therefore, such stress concentration increases the possibility of breakdown of the reclining device 20. If breakdown occurs, it is very difficult to repair the reclining device 20.

SUMMARY OF THE INVENTION

Accordingly, the present invention has been made keeping in mind the above problems occurring in the prior art, and an object of the present invention is to provide a reclining device for vehicle seats which has a structure capable of reliably maintaining a seat back in a locking state when a seat back of a vehicle seat is not reclined, thus preventing the seat back from being undesirably moved on the seat cushion, thereby providing a smooth comfortable ride, and, particularly, providing stability to a driver to promote safe driving.

Another object of the present invention is to provide a reclining device for vehicle seats in which components constituting the reclining device are more firmly coupled together despite having simple structures, thus enhancing manufacturability and productivity and providing superior durability, thereby increasing the life span of the reclining device, and minimizing the possibility of breakdown thereof.

In order to accomplish the above object, the present invention provides a reclining device for vehicle seats, including: a base plate mounted to a seat cushion frame of a vehicle seat, with a shaft hole formed through a central portion of the base plate; an arm plate mounted to a seat back frame of the vehicle seat, with a shaft hole formed through a central portion of the arm plate, and internal gear teeth provided along an inner circumferential surface of the arm plate; a central shaft inserted into the shaft holes of both the base plate and the arm plate and coupled at a first end thereof to an interlocking shaft provided in the vehicle seat; a cam, a pair of locks and a guide plate sequentially placed around the central shaft between the base plate and the arm plate; an action spring to rotate the central shaft in a predetermined direction; a return spring coupled to a second end of the central shaft outside the base plate; and an actuating lever coupled to the second end of the central shaft. The base plate has a fastening hole formed around the central hole in the base plate so that an outer end of the action spring is held in the fastening hole. The central shaft has: a first angled part provided on an intermediate portion of the central shaft so that an inner end of the action spring is fitted over and fastened to the first angled part of the central shaft; and a second angled part provided on the second end of the central shaft. The cam has: a through hole formed at a predetermined position in the cam in a shape corresponding to an outline of the first angled part of the central shaft; a main cam heel provided on each of diametrically opposite sides of the cam; and a pair of subsidiary cam heels provided on opposite sides of the main cam heel, with a cam recess formed between the main cam heel and each of the subsidiary cam heels. Each of the locks has: a main lock heel and a pair of subsidiary lock heels provided on the lock to correspond to both the main cam heel and the subsidiary cam heels of the cam, with a lock recess formed between the main lock heel and each of the subsidiary lock heels; and a guide protrusion provided on a surface of the lock in a direction parallel to an axis of the central shaft. The guide plate has a coupling hole formed in a central portion of the guide plate and having a shape corresponding to an outline of the cam. The actuating lever has an angled hole formed at a predetermined position in the actuating lever so that the second angled part of the central shaft is inserted into the angled hole of the actuating lever.

The first end of the central shaft may have an external spline part, and the interlocking shaft, which is coupled to the first end of the central shaft to rotate a hinge shaft that is provided in the vehicle seat at a position opposite the reclining device, may have an internal spline part.

The guide plate may further have an elongated protrusion provided on a surface of the guide plate which is in close contact with the pair of locks.

The reclining device may further include a plurality of first pins inserted into a plurality of first pin holes, which are formed at predetermined positions in both the base plate and the arm plate, thus guiding a rotation of the arm plate; and a second pin inserted into a second pin hole, which is formed at a predetermined position in the arm plate, so that an outer end of the return spring is supported by the second pin.

The cam may further have a pair of end protrusions provided on each of opposite ends of the cam at positions angularly spaced apart from the cam heels, with an end groove defined between the end protrusions. The guide plate may further have an inner protrusion and a pair of inner grooves provided on each of opposite sides of an edge of the coupling hole to correspond to the end groove and the pair of end protrusions of the cam, so that the cam is inserted into the coupling hole of the guide plate and operated in conjunction with the guide plate.

The reclining device may further include a support bracket mounted to a predetermined position of the base plate, with a stopper provided at a predetermined position on the support bracket to support an inner end of the return spring; and a cover base mounted along with the support bracket to the base plate.

The reclining device may further include a positioner provided on a predetermined position of the support bracket to prevent the return spring from moving in an axial direction of the central shaft or being removed from the central shaft.

BRIEF DESCRIPTION OF THE DRAWINGS

The above and other objects, features and advantages of the present invention will be more clearly understood from the following detailed description taken in conjunction with the accompanying drawings, in which:

FIG. 5b is a left side view of FIG. 5a;

FIG. 5c is a right side view of FIG. 5a;

DESCRIPTION OF THE PREFERRED EMBODIMENTS

Hereinafter, embodiments of the present invention will be described in detail with reference to the attached drawings.

For reference, to explain components of the present invention, designations unlike conventional arts may be used.

Figure 3:
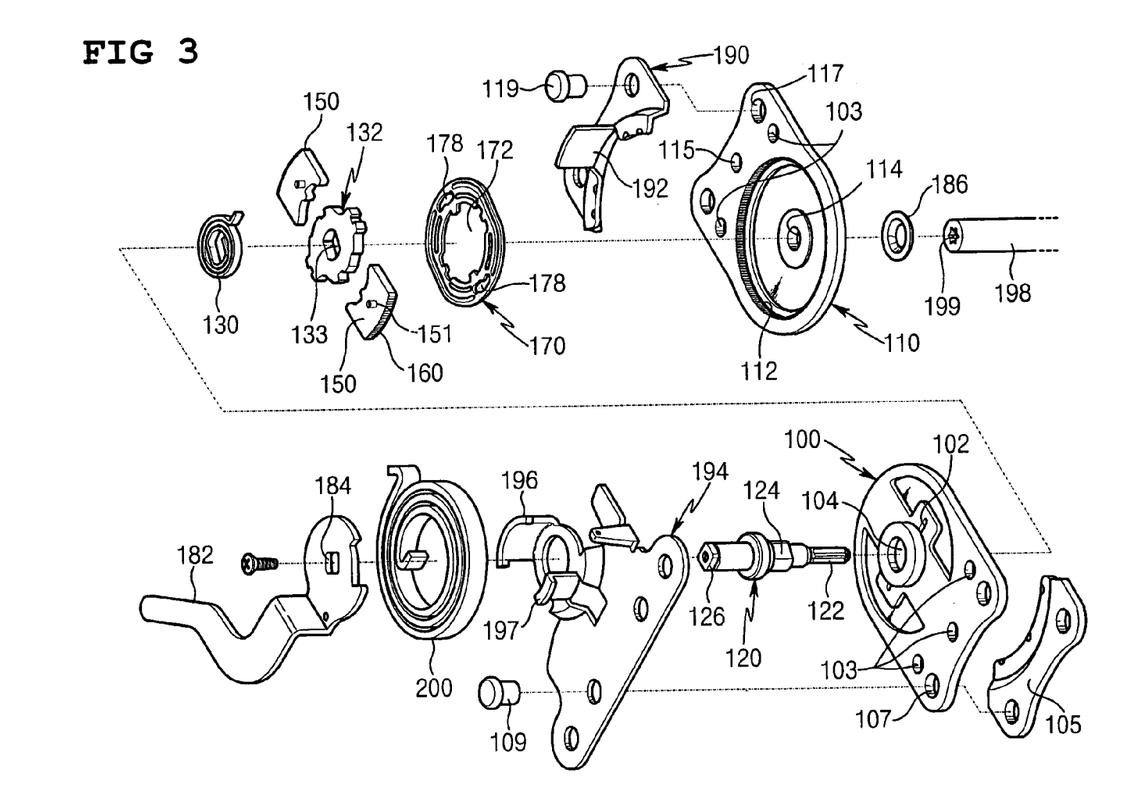
FIG. 3 is an exploded perspective view of a reclining device for vehicle seats, according to an embodiment of the present invention.
Figure 4:
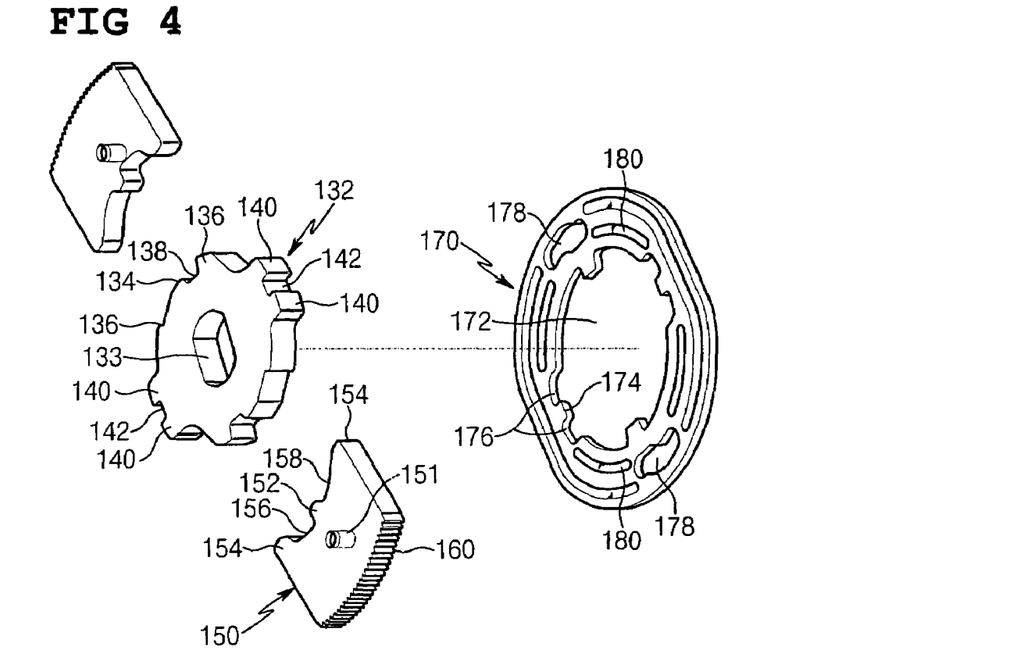
FIG. 4 is a perspective view showing an enlargement of an important part of the reclining device of FIG. 3.

FIG. 3 is an exploded perspective view of a reclining device for vehicle seats, according to an embodiment of the present invention. FIG. 4 is a perspective view showing an enlargement of an important part of the reclining device of FIG. 3. As shown in FIGS. 3 and 4, the reclining device includes a base plate 100 which is mounted at a predetermined position to a seat cushion frame of a vehicle seat, and an arm plate 110 which is mounted at a predetermined position to a lower end of a seat back frame of the vehicle seat and internal gear teeth 112 provided along an inner circumferential surface of the arm plate 110.

The base plate 100 has a first shaft hole 104 which is formed through a central portion of the base plate 100, so that a central shaft 120 is inserted into the first shaft hole 104. The base plate 100 further has a pair of fastening holes 102 which is formed around opposite side of the first shaft hole 104. Thus, an outer end of an action spring 130 is held in one fastening hole 102. A plurality of first coupling holes 107 is formed at predetermined positions through the base plate 100, so as to couple both a first cover base 105 and a support bracket 194, which will be described later herein, to the base plate 100 through the first coupling holes 107 using coupling pins 109. A plurality of guide pin holes 103 are formed at predetermined positions through the base plate 100, so that, in the case in which a plurality of guide pins 111 is used in place of the first cover base 105, the guide pins 111 may be inserted into the guide pin holes 103 without the first cover base 105.

Furthermore, a plurality of second coupling holes 117 is formed at predetermined positions through the arm plate 110, so as to couple a second cover base 190, which will be described later herein, to the arm plate 110 through the second coupling holes 117 using coupling pins 119. A support pin hole 115 and other guide pin holes 103 are formed at predetermined positions through the arm plate 110, so as to respectively receive a support pin 121 and other guide pins 111 when using both the support pin 121 and the guide pins 111 in place of the second cover base 190.

The central shaft 120 passes through both the base plate 100 and the arm plate 110. The action spring 130, a pair of locks 150, a cam 132 and a guide plate 170 are sequentially placed around the central shaft 120 between the base plate 100 and the arm plate 110. A return spring 200 and an actuating lever 182 are coupled to the central shaft 120 outside the base plate 100. An interlocking shaft 198, which interlocks a hinge shaft (not shown) that is provided in the vehicle seat at a position opposite the reclining device, is coupled to the central shaft 120 outside the base plate 100.

The central shaft 120 is inserted from the outside of the base plate 100 into the first shaft hole 104 of the base plate 100. The central shaft 120 includes an external spline part 122 which has a predetermined length and is provided on a first end of the central shaft 120, a first angled part 124 which is provided on an intermediate portion of the central shaft 120, and a second angled part 126 which has a predetermined length and is provided on a second end of the central shaft 120.

The base plate 100 and the arm plate 110 respectively have the first shaft hole 104 and a second shaft hole 114 at central portions thereof for the central shaft 120 to pass therethrough. The cam 132 has a through hole 133 which is formed on a central portion of the cam 132 in a shape corresponding to an outline of the first angled part 124 of the central shaft 120.

The interlocking shaft 198 has an internal spline part 199 on an inner surface thereof to correspond to the external spline part 122 of the central shaft 120.

The process of coupling the central shaft 120 to the interlocking shaft 198 is as follows. As shown in FIGS. 3 through 5c, the first end of the central shaft 120 sequentially passes through the first shaft hole 104 of the base plate 100, the through hole 133 of the cam 132, and the second shaft hole 114 of the arm plate 110. A push nut 186 is fitted over the central shaft 120 outside the arm plate 110 to prevent the arm plate 110 from being removed from the central shaft 120. Thereafter, the external spline part 122 of the first end of the central shaft 120 is fitted into the internal spline part 199 of the interlocking shaft 198, thus forming a structure in which the base plate 110, the cam 132, the guide plate 170, the arm plate 110 and the interlocking shaft 198 are sequentially coupled to the central shaft 120.

The action spring 130, the outer end of which is held by the fastening hole 102 of the base plate 100, is coupled to the first angled part 124 of the central shaft 120. Here, the action spring 130 is fastened to the first angled part 124 of the central shaft 120 and is operated in conjunction with the central shaft 120. Furthermore, because the through hole 133 of the cam 132 is fitted over and fasted to the first angled part 124 of the central shaft 120, the cam 132 is also operated in conjunction with the central shaft 120.

As shown in FIG. 4, the cam 132 has a main cam heel 134 which is provided on each of diametrically opposite sides of the cam 132, and a pair of subsidiary cam heels 136 which is provided at opposite sides of the main cam heel 134. A cam recess 138 having a predetermined depth is formed between the main cam heel 134 and each of the subsidiary cam heels 136.

The pair of locks 150 is placed outside the cam 132. Each lock 150 has external gear teeth 160 on an outer surface thereof to correspond to the internal gear teeth 112 of the arm plate 110. Each lock 150 further has a main lock heel 152 that is provided on an inner surface of the lock 150, which is in close contact with the cam 132, to correspond to each main cam heel 134 of the cam 132. Each lock 150 further has a pair of subsidiary lock heels 154 which is provided on opposite sides of the lock 150 based on the main lock heel 152, with a lock recess 156, 158 formed between the main lock heel 152 and each of the subsidiary lock heels 154.

The guide plate 170 is operated in conjunction with the cam 132. The guide plate 170 has a specially shaped slot 178 which is provided on each of diametrically opposite sides of the guide plate 170, such that, when the guide plate 170 rotates so as to unlock the locks 150, the locks 150 are moved inwards. The guide plate 170 further has a coupling hole 172 which is formed in a central portion of the guide plate 170 and has a shape corresponding to the outline of the cam 132, so that the cam 132 is inserted into the coupling hole 172 and fastened to the guide plate 170.

In detail, the cam 132 has a pair of end protrusions 140 and an end groove 142 which are provided on each of opposite ends of the cam 132 at positions angularly spaced apart from the cam heels. Both an inner protrusion 174 and a pair of inner grooves 176 are provided on each of opposite sides of an edge of the coupling hole 172 of the guide plate 170 to correspond to the end groove 142 and the pair of end protrusions 140 of the cam 132. Thus, the cam 132 is fitted into the coupling hole 172 of the guide plate 170 and operated in conjunction with the guide plate 170.

The guide plate 170 has an elongated protrusion 180 which is provided on a surface of the guide plate 170 which is in close contact with the pair of locks 150, so as to guide movement of the locks 150 and prevent the locks 150 from being undesirably removed from the original positions. Furthermore, the elongated protrusion 180 serves to minimize a gap between each lock 150 and the arm plate 110, thus reducing noise occurring due to the gap.

The actuating lever 182 has an angled hole 184 which is formed at a predetermined position in the actuating lever 182, so that the second angled part 126 of the central shaft 120 is inserted into the angled hole 184 of the actuating lever 182. Both the return spring 200 and the support bracket 194 are placed between the actuating lever 182 and the central shaft 120.

To limit the rotation of the arm plate 110, the return spring 200 is supported at an outer end thereof by a stopper 192 of the second cover base 190, which is attached to the arm plate 110 using the coupling pins 119 by riveting or welding. An inner end of the return spring 200 is supported by a stopper 196 of the support bracket 194, which is attached to the base plate 100 along with the first cover base 105 using the coupling pins 109 by riveting or welding.

The support bracket 194, on which the stopper 196 is provided, has a positioner 197 which is provided at a predetermined position around the stopper 196 on the support bracket 194, thus preventing the return spring 200, both ends of which are supported by the stoppers 192 and 196 of the cover base 190 and support bracket 194, from undesirably moving in an axial direction of the central shaft 120 or being removed from the central shaft 120.

Figure 5A:
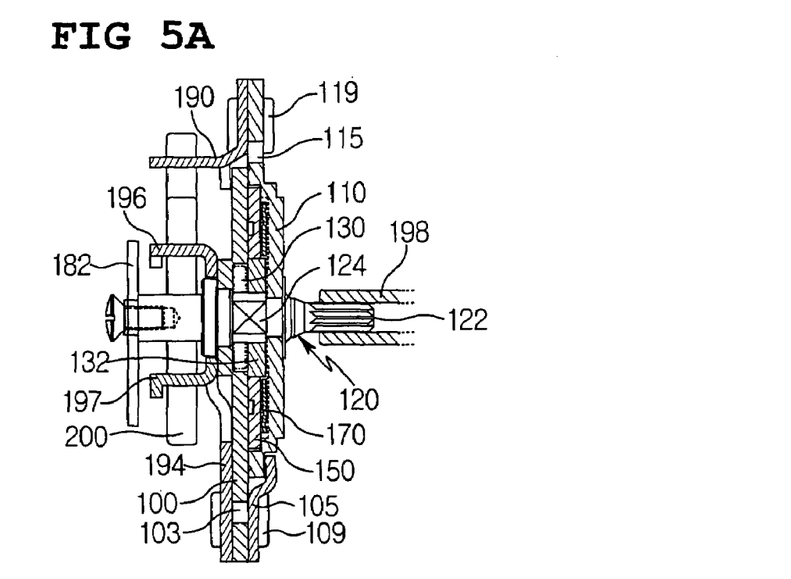
FIG. 5a is a sectional view of the assembled reclining device of FIG. 3.
Figure 5B:
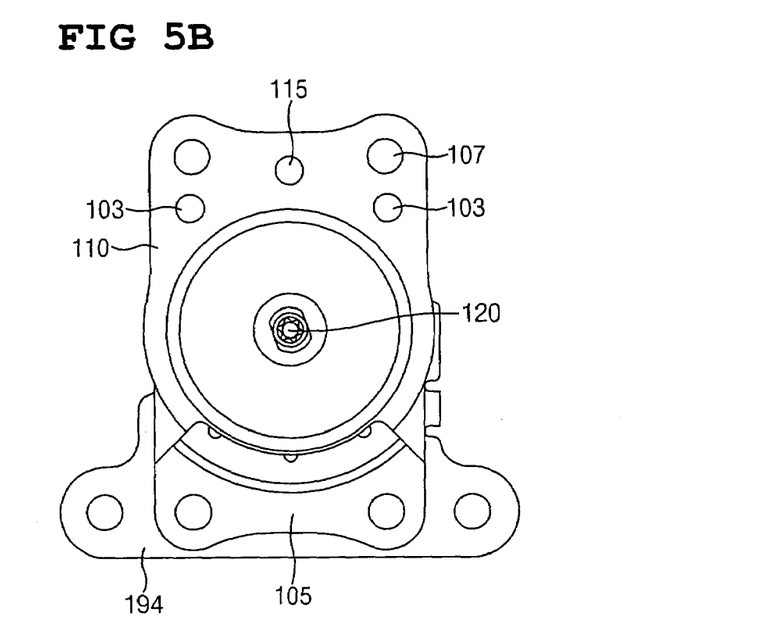
Figure 5C:
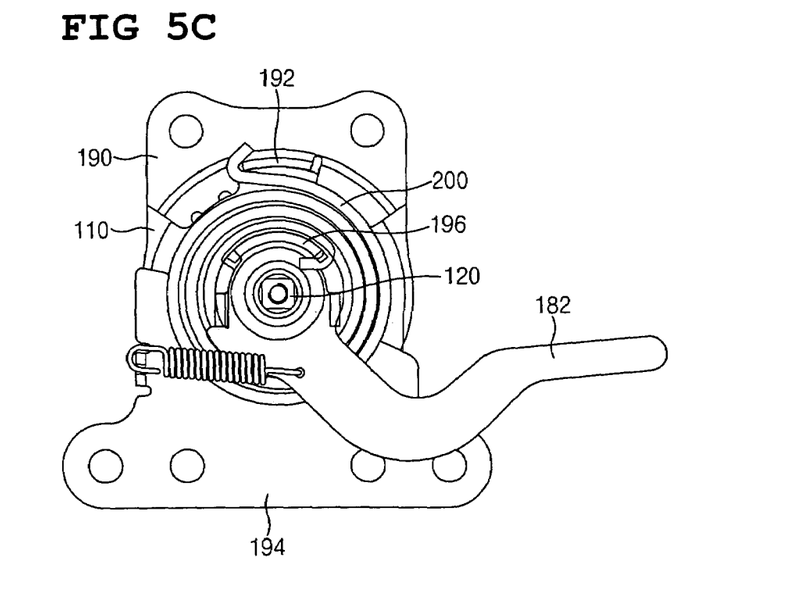
Figure 5D:
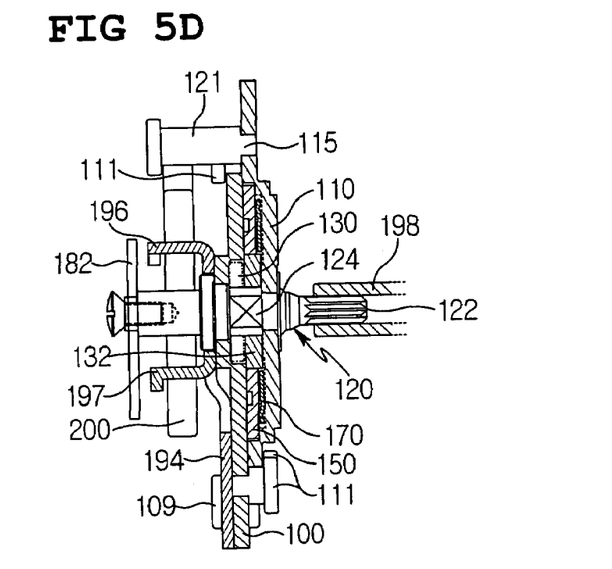
FIG. 5d is a sectional view of a reclining device for vehicle seats, according to another embodiment of the present invention.

FIG. 5d is a sectional view of a reclining device for vehicle seats, according to another embodiment of the present invention. In this embodiment, as shown in FIG. 5d, the support pin 121 is fastened to the support pin hole 115 of the arm plate 110 by riveting or welding, thus serving as the stopper 192 of the second cover base 190 of the first embodiment. In detail, the support pin 121 is fastened to the support pin hole 115, which is placed at the middle of the pin holes of the arm plate 110, so that the outer end of the return spring 200 is supported by the support pin 121. The guide pin 111 is fastened to each of the guide pin holes 103 of the arm plate 110 which are formed at both sides of the support pin hole 115, thus guiding the rotation of the arm plate 110. As such, because the support pin 121 and the guide pins 111 of the arm plate 110 serve as the second cover base 190, the second cover base 190 can be excluded.

Furthermore, other guide pins 111 are fastened to the guide pin holes 103 of the base plate 100 by riveting or welding. The guide pins 111 of the base plate 100 serve as the first cover base 105 of the first embodiment. In other words, because the guide pins 111, which are inserted into the guide pin holes 103 of the base plate 100, guide the rotation of the arm plate 110, the first cover base 105 can be excluded.

Hereinafter, the operation of the reclining device for vehicle seats having the above-mentioned construction will be explained.

Figure 6A:
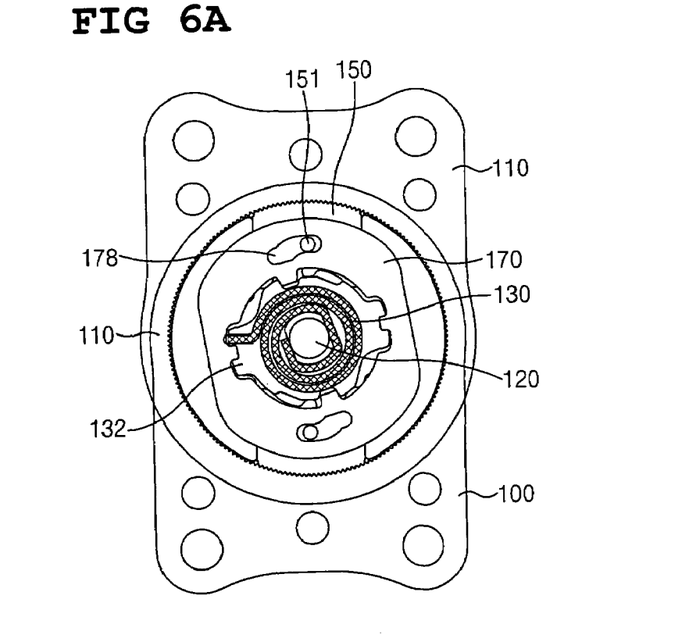
FIG. 6a is a view showing operation of the reclining device for vehicle seats according to the present invention while in a locking state to prevent a vehicle seat from being reclined.
Figure 7A:
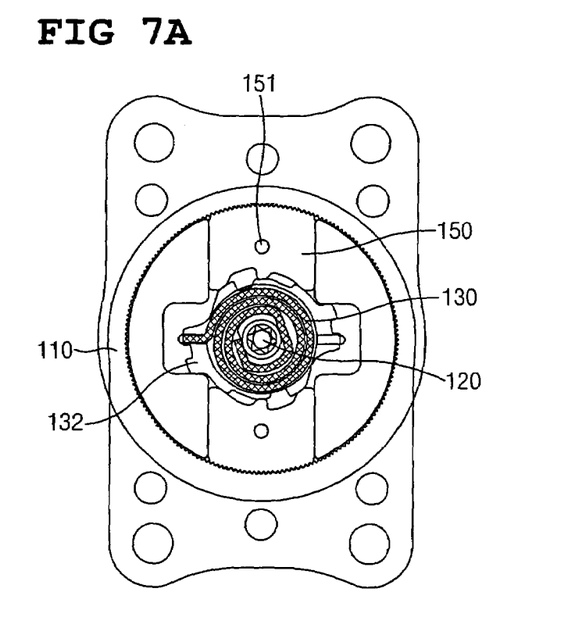
FIG. 7a is a view more clearly showing the operation of the reclining device without the guide plate shown in FIG. 6a while in the locking state.

In a locking state to prevent a reclining motion of the reclining device, the external gear teeth 160 of the locks 150 engage with the internal gear teeth 112 of the arm plate 110, as shown in FIGS. 6a and 7a. At this time, because the action spring 130 is coupled to the first angled part 124 of the central shaft 120 and the outer end of the action spring 130 is held by the fastening hole 102 of the base plate 100, the central shaft 120 is biased in one direction by the elasticity of the action spring 130.

Therefore, both the cam 132, which is fitted over the first angled part 124 of the central shaft 120 through the through hole 133 of the cam 132, and the guide plate 170, which has both the inner grooves 176 and the inner protrusions 174 corresponding to both the end protrusions 140 and the end grooves 142 of the cam, are biased by the elasticity of the action spring 130 in the same direction as that of the central shaft 120.

At this time, as shown in FIGS. 6a and 7a, each main cam heel 134 of the cam 132 is in close contact with the main lock heel 152 of each lock 150, so that the engagement of the external gear teeth 160 of each lock 150 with the internal gear teeth 112 of the arm plate 110 is maintained. Therefore, the seat back frame, to which the arm plate 110 is mounted, remains stationary. In this state, while each main cam heel 134 of the cam 132 is in close contact with the main lock heel 152 of each lock 150 to push the lock 150 outwards, each subsidiary cam heel 136 of the cam 132 is in close contact with each subsidiary lock heel 154 of the lock 150, thus preventing eccentric load from occurring. Accordingly, even though the action spring 130 biases the cam 132 in one direction for a long time, the reclining device can maintain the reliable locking state.

Figure 8B:
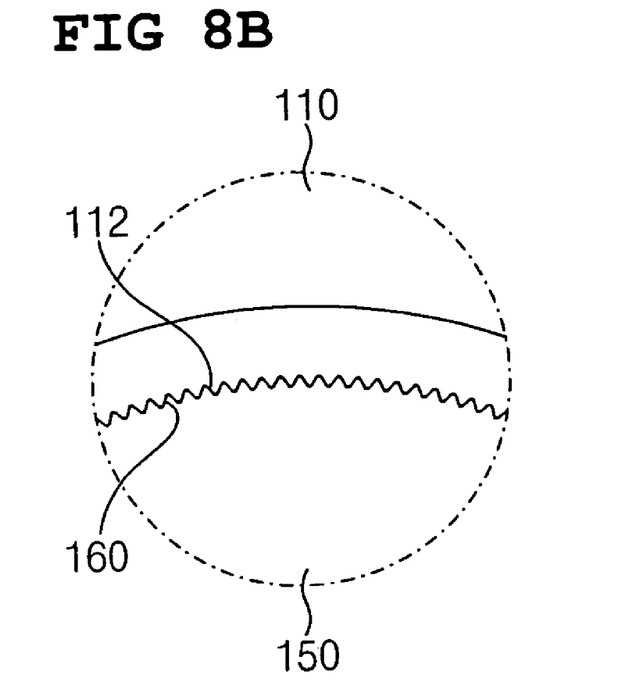

In other words, because each lock 150 is smoothly moved outwards by the cam 132 without the eccentric load, as shown in FIG. 8b, the external gear teeth 160 of the lock 150 perfectly engage with the internal gear teeth 112 of the arm plate 110, thus preventing the occurrence of a gap between the internal and external gear teeth 112 and 160, thereby forming the reliable locking structure. As a result, the seat back of the vehicle seat does not undesirably move due to a reduced gap between the internal and external gear teeth 112 and 160.

When it is desired to recline the seat back, the actuating lever 182 is pulled upwards. As such, when the actuating lever 182 is rotated upwards, the central shaft 120, the second angled part 126 of which is inserted into the angled hole 184 of the actuating lever 182, is rotated in a predetermined direction along with the actuating lever 182. As a result, the action spring 130 is compressed and, simultaneously, the cam 132, which is fitted at the through hole 133 thereof over the first angled part 124 of the central shaft 120, is rotated at a predetermined angle along with the central shaft 120.

Then, each main cam heel 134 of the cam 132 is moved away from the main lock heel 152 of each lock 150 and moved towards the lock recess 156, which is defined between the main lock heel 152 and the associated subsidiary lock heel 154 of each lock 150. Furthermore, the associated subsidiary cam heel 136 is moved towards the other lock recess 158, which is defined between the main lock heel 152 and the other subsidiary lock heel 154 of each lock 150. Thus, the locks 150, which have been pushed outwards by the cam 132, are released.

Figure 6B:
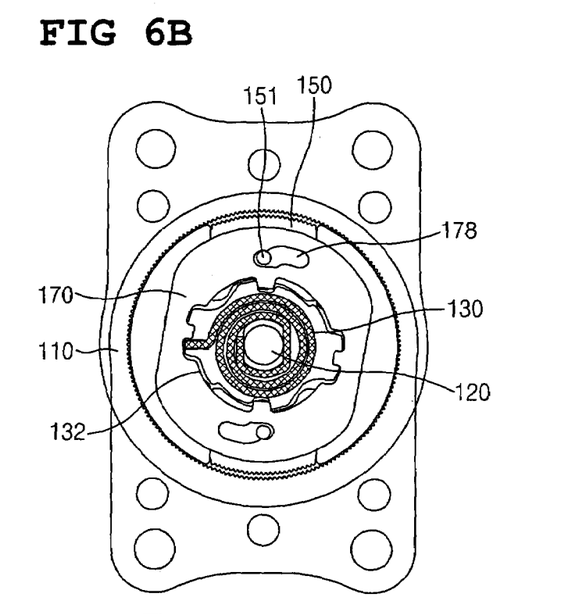
FIG. 6B is a view showing operation of the reclining device for vehicle seats according to the present invention while in an unlocking state to recline a vehicle seat.
Figure 7B:
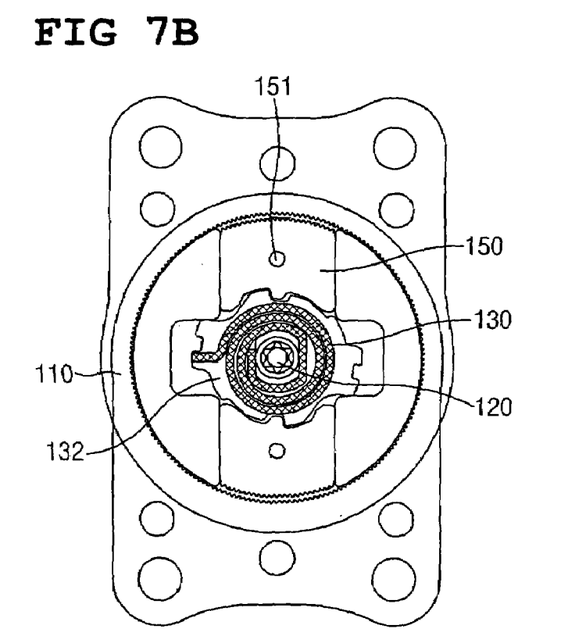
FIG. 7b is a view more clearly showing the operation of the reclining device without the guide plate shown in FIG. 6b while in the unlocking state.

Simultaneously, as a guide protrusion 151 of each lock 150 moves along each specially shaped slot 178 of the guide plate 170, which is coupled to the cam 132, the guide plate 170 pulls the locks 150 inwards. Thus, each main cam heel 134 and each subsidiary cam heel 136 are inserted into the associated lock recess 156, 158 of each lock 150. Then, as shown in FIGS. 6b and 7b, the external gear teeth 160 of each lock 150 disengage from the internal gear teeth 112 of the arm plate 110.

In this state, in which the external gear teeth 160 of each lock 150 disengage from the internal gear teeth 112 of the arm plate 110, a driver or other occupant pushes the seat back backwards at a desired angle and, thereafter, releases the actuating lever 182.

Then, the central shaft 120 is rotated towards the original position by the tension of the action spring 130. Simultaneously, both the cam 132 and the guide plate 170 are rotated along with the central shaft 120, so that the cam 132 pushes the locks 150 outwards. Then, the external gear teeth 160 of each lock 150 engage with the internal gear teeth 112 of the arm plate 110, thus the seat back enters the locking state to prevent unexpected reclining motion.

When it is desired to return the reclined seat back to the original state, the occupant pulls the actuating lever 182 such that the external gear teeth 160 of each lock 150 disengage from the internal gear teeth 112 of the arm plate 110, thus making it possible for the seat back to be moved. In this state, if outside force is not applied to the seat back, the seat back is returned to the original position by the restoring force of the return spring 200 which is coupled at the inner end thereof to the stopper 196 of the support bracket 194 and is coupled at the outer end thereof to the stopper 192 of the second cover base 190 or to the support pin 121, which is riveted to the support pin hole 115 of the arm plate 110.

As described above, the present invention provides a reclining device for vehicle seats in which external gear teeth of each lock reliably engage with internal gear teeth of an arm plate without a gap between them regardless of the angle of a reclined seat back frame with respect to a seat cushion frame, so that, even when a vehicle travels on an uneven surface of a road as well as when it travels on an even surface, the seat back frame is not undesirably moved with respect to the seat cushion frame, thus providing a smooth comfortable ride and a sense of stability to an occupant, and, particularly, promoting safety driving of a driver.

Furthermore, compared with conventional reclining devices, each component constituting the reclining device according to the present invention has a simple structure and, as well, the components are coupled together by an integrated coupling method in place of a conventional partial coupling method, thus enhancing the productivity and manufacturability of the components.

Moreover, the integrated coupling method of the present invention solves a stress concentration problem of conventional reclining devices occurring in specific parts of components, thereby reducing the possibility of breakdown, and increasing the life span of the reclining device.

In addition, because the reclining device of the present invention has pin holes on both the base plate and the arm plate, a plurality of pins may be riveted to the pin holes to support an end of a return spring and guide rotation of the arm plate in place of cover bases. In this case, the construction of the reclining device is more simplified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reclining device for vehicle seats, comprising: a base plate adapted to be mounted to a seat cushion frame of a vehicle seat, with a shaft hole formed through a central portion of the base plate; an arm plate adapted to be mounted to a seat back frame of the vehicle seat, with a shaft hole formed through a central portion of the arm plate, and internal gear teeth provided along an inner circumferential surface of the arm plate; a central shaft inserted into the shaft holes of both the base plate and the arm plate and coupled at a first end thereof to an interlocking shaft adapted to be provided in the vehicle seat; a cam having a pair of locks positioned thereabout; a guide plate placed adjacent the cam about the central shaft between the base plate and the arm plate; an action spring to rotate the central shaft in a predetermined direction; a return spring coupled to a second end of the central shaft outside the base plate; and an actuating lever coupled to the second end of the central shaft, wherein:

the base plate comprises:
a fastening hole formed around the shaft hole in the base plate so that an outer end of the action spring is held in the fastening hole, the central shaft comprises:
a first angled part provided on an intermediate portion of the central shaft so that an inner end of the action spring is fitted over and fastened to the first angled part of the central shaft; and
a second angled part provided on the second end of the central shaft, the cam comprises:
- a through hole formed at a predetermined position in the cam in a shape corresponding to an outline of the first angled part of the central shaft;
- a main cam heel provided on each of diametrically opposite sides of the cam; and
- a pair of subsidiary cam heels provided on opposite sides of the main cam heel, with a cam recess formed between the main cam heel and each of the subsidiary cam heels, each of the locks comprises:
- a main lock heel and a pair of subsidiary lock heels provided on the lock to correspond to both the main cam heel and the subsidiary cam heels of the cam, with a lock recess formed between the main lock heel and each of the subsidiary lock heels; and
- a guide protrusion provided on a surface of the lock in a direction parallel to an axis of the central shaft, the guide plate comprises:
- a coupling hole formed in a central portion of the guide plate and having a shape corresponding to an outline of the cam, and the actuating lever comprises:
- an angled hole formed at a predetermined position in the actuating lever so that the second angled part of the central shaft is inserted into the angled hole of the actuating lever.

2. The reclining device for vehicle seats as set forth in claim 1, wherein the first end of the central shaft comprises an external spline part, and the interlocking shaft, which is coupled to the first end of the central shaft and adapted to rotate a hinge shaft that is provided in the vehicle seat at a position opposite the reclining device, comprises an internal spline part.

3. The reclining device for vehicle seats as set forth in claim 1, wherein the guide plate further comprises:
an elongated protrusion provided on a surface of the guide plate which is in close contact with the pair of locks.

4. The reclining device for vehicle seats as set forth in claim 1, further comprising:

a plurality of first pins inserted into a plurality of first pin holes, which are formed at predetermined positions in both the base plate and the arm plate, thus guiding a rotation of the arm plate; and a second pin inserted into a second pin hole, which is formed at a predetermined position in the arm plate, so that an outer end of the return spring is supported by the second pin.

5. The reclining device for vehicle seats as set forth in claim 1, wherein the cam further comprises:
a pair of end protrusions provided on each of opposite ends of the cam at positions angularly spaced apart from the cam heels, with an end groove defined between the end protrusions, and the guide plate further comprises:
an inner protrusion and a pair of inner grooves provided on each of opposite sides of an edge of the coupling hole to correspond to the end groove and the pair of end protrusions of the cam, so that the cam is inserted into the coupling hole of the guide plate and operated in conjunction with the guide plate.

6. The reclining device for vehicle seats as set forth in claim 1, further comprising:

a support bracket mounted to a predetermined position of the base plate, with a stopper provided at a predetermined position on the support bracket to support an inner end of the return spring; and a cover base mounted along with the support bracket to the base plate.

7. The reclining device for vehicle seats as set forth in claim 6, further comprising:

a positioner provided on a predetermined position of the support bracket to prevent the return spring from moving in an axial direction of the central shaft or being removed from the central shaft.

* * * * *

UNITED STATES PATENT AND TRADEMARK OFFICE
CERTIFICATE OF CORRECTION

PATENT NO. : 7,188,905 B2  
APPLICATION NO. : 11/083059  
DATED : March 13, 2007  
INVENTOR(S) : Ham Page 1 of 1

It is certified that error appears in the above-identified patent and that said Letters Patent is hereby corrected as shown below:

On The Title Page, Item (56)  
<u>Face of the Patent</u>, See Item (56) References Cited, U.S. PATENT DOCUMENTS, Column 2, the last reference "2005/0168035 A1* 8/2005 Fast .......297/367"

should read -- 2005/016803<u>4</u> A1* 8/2005 Fast .......297/367 --

Signed and Sealed this

Seventh Day of August, 2007

JON W. DUDAS  
*Director of the United States Patent and Trademark Office*